US010320860B1

(12) United States Patent
Bunner et al.

(10) Patent No.: US 10,320,860 B1
(45) Date of Patent: Jun. 11, 2019

(54) SERVER ORCHESTRATED CONNECTIVITY

(71) Applicant: Google LLC, Mountain View, CA (US)

(72) Inventors: Andrew Ames Bunner, Belmont, CA (US); Alan Lee Gardner, III, San Mateo, CA (US); Mohammed Waleed Kadous, Santa Clara, CA (US); Brian Patrick Williams, Mountain View, CA (US); Marc Stogaitis, San Mateo, CA (US); Nadav Aharony, Sunnyvale, CA (US); Brian Duff, Santa Clara, CA (US); Pascal Tom Getreuer, San Francisco, CA (US); Zhentao Sun, Sunnyvale, CA (US); Daniel Estrada Alva, Mountain View, CA (US); Ami Patel, Mountain View, CA (US); Benjamin Razon, Mountain View, CA (US); Richard Daniel Webb, Redwood, CA (US); Tony Weber, San Jose, CA (US); Thomas Yuchin Chao, Burlingame, CA (US); Ryan Michael Rifkin, San Francisco, CA (US); Richard Francis Lyon, Los Altos, CA (US); Liem Tran, Milpitas, CA (US); Joseph A. Farfel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 287 days.

(21) Appl. No.: 14/749,445

(22) Filed: Jun. 24, 2015

Related U.S. Application Data

(60) Provisional application No. 62/016,581, filed on Jun. 24, 2014, provisional application No. 62/016,583, filed on Jun. 24, 2014.

(51) Int. Cl.
*G06F 15/16* (2006.01)
*H04L 29/06* (2006.01)
*H04L 29/08* (2006.01)

(52) U.S. Cl.
CPC ............ *H04L 65/403* (2013.01); *H04L 67/10* (2013.01)

(58) Field of Classification Search
CPC .................................................... H04L 65/403
(Continued)

(56) References Cited

U.S. PATENT DOCUMENTS

| 8,213,617 B1 | 7/2012 | Appleton | |
| 8,699,952 B2 * | 4/2014 | Yeung | H04W 84/18 455/404.2 |

(Continued)

FOREIGN PATENT DOCUMENTS

WO    WO2014033351    3/2014

OTHER PUBLICATIONS

Kovach, Steve, "How to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

*Primary Examiner* — Kevin T Bates
*Assistant Examiner* — Clarence D McCray
(74) *Attorney, Agent, or Firm* — IP Spring

(57) ABSTRACT

The disclosure includes a system and method for detecting fine grain copresence between users. The system includes a processor and a memory storing instructions that when executed cause the system to: transmit a wakeup signal to a plurality of devices based on coarse grain location information; send a request to a first device of the plurality of devices to transmit a token using a first communication technology to determine fine grain copresence; receive a first
(Continued)

token acknowledgment from a first subset of the plurality of devices; send a request to a second device of the first subset of the plurality of devices to transmit the token using a second communication technology to determine fine grain copresence; receive a second token acknowledgment from a second subset of the plurality of devices; and refine copresence based on receiving the first and second token acknowledgment.

20 Claims, 9 Drawing Sheets

(58) Field of Classification Search
USPC .......................................... 709/204
See application file for complete search history.

(56) References Cited

U.S. PATENT DOCUMENTS

| | | | | |
|---|---|---|---|---|
| 8,836,530 | B1* | 9/2014 | Bowers | G06F 21/32 340/517 |
| 9,042,912 | B1* | 5/2015 | Bunner | H04L 67/18 455/456.1 |
| 9,769,624 | B1* | 9/2017 | Aharony | H04W 4/023 |
| 2005/0250552 | A1 | 11/2005 | Eagle et al. | |
| 2008/0147798 | A1 | 6/2008 | Paalasmaa et al. | |
| 2009/0181653 | A1 | 7/2009 | Alharayeri | |
| 2010/0064172 | A1* | 3/2010 | George | H04L 67/14 714/15 |
| 2010/0169212 | A1* | 7/2010 | Paintin | G06Q 20/10 705/40 |
| 2010/0311336 | A1* | 12/2010 | Huotari | H04M 1/72572 455/41.3 |
| 2011/0028129 | A1 | 2/2011 | Hutchison et al. | |
| 2011/0142016 | A1* | 6/2011 | Chatterjee | G06Q 30/02 370/338 |
| 2011/0179064 | A1 | 7/2011 | Russo | |
| 2011/0238755 | A1* | 9/2011 | Khan | H04W 4/21 709/204 |
| 2012/0070158 | A1* | 3/2012 | Allee | G06K 19/07766 398/182 |
| 2012/0158847 | A1* | 6/2012 | Bertin | H04L 63/0492 709/204 |
| 2012/0258665 | A1* | 10/2012 | Sip | H04W 84/18 455/41.2 |
| 2012/0291102 | A1* | 11/2012 | Cohen | G06F 21/57 726/4 |
| 2012/0291103 | A1* | 11/2012 | Cohen | G06F 21/6218 726/4 |
| 2012/0326922 | A1* | 12/2012 | Yang | G01S 19/34 342/357.3 |
| 2013/0031606 | A1* | 1/2013 | Wei | G06Q 50/01 726/3 |
| 2013/0217332 | A1 | 8/2013 | Altman et al. | |
| 2013/0260693 | A1 | 10/2013 | Un et al. | |
| 2013/0281110 | A1* | 10/2013 | Zelinka | G01S 5/0284 455/456.1 |
| 2014/0095901 | A1* | 4/2014 | Stefanov | G06F 1/3206 713/310 |
| 2014/0248909 | A1* | 9/2014 | Kuntagod | H04W 4/029 455/456.3 |
| 2014/0263629 | A1* | 9/2014 | McQuade | G07F 7/12 235/381 |

* cited by examiner

SERVER ORCHESTRATED CONNECTIVITY

CROSS REFERENCE TO RELATED APPLICATIONS

The present application claims priority, under 35 U.S.C. § 119, of U.S. Provisional Patent Application No. 62/016,581, filed Jun. 24, 2014 and entitled "Server Orchestrated Connectivity," which is incorporated by reference in its entirety. The present application also claims priority, under 35 U.S.C. § 119, of U.S. Provisional Patent Application No. 62/016,583, filed Jun. 24, 2014 and entitled "Copresence Permission Model," which is also incorporated by reference in its entirety.

BACKGROUND

Existing systems typically take advantage of Global Positioning System (GPS) data to locate a user device and determine copresence with other user devices. However, GPS is power intensive and used infrequently, which results in a possibility of stale data. Moreover, the GPS hardware in some mobile devices is not accurate enough to provide a true copresence determination. In addition, if GPS is used indoors, the GPS signal may not be available and, as a result, the user device switches to using Wi-Fi or cellular means of location detection, which are much less accurate. Similarly, other copresence detection technologies, such as Bluetooth, audio, Wi-Fi, or the like, can be power intensive and would result in poor device battery life if constantly left running. Additionally, existing systems may be prone to spoofing (e.g., sending a fake coordinate to a server, etc.).

SUMMARY

According to one innovative aspect of the subject matter described in this disclosure, a system for determining fine grain copresence of user devices includes a processor and a memory storing instructions that, when executed, cause the system to: transmit a wakeup signal to a plurality of devices based on coarse grain location information; send a request to a first device of the plurality of devices to transmit a token using a first communication technology to determine fine grain copresence; receive a first token acknowledgment from a first subset of the plurality of devices; send a request to a second device of the first subset of the plurality of devices to transmit the token or a another token using a second communication technology to determine fine grain copresence; receive a second token acknowledgment from a second subset of the plurality of devices; and refine copresence based on receiving the first and second token acknowledgment.

These and other embodiments may each optionally include one or more of the following features. For instance, the coarse grain location information may be supplemented by location information provided by one or more of GPS, Wi-Fi, a cellular network, IP address information, or other sensor information (e.g., accelerometer patterns, barometer, temperature, or the like). For example, by looking at accelerometer patterns, barometer, or temperature information, it may be determined that two devices are located in the same vehicle. The fine grain copresence token may be transmitted using one or more of inaudible audio, audible audio Bluetooth, BLE, Wi-Fi, or near field communications. Coarse grain copresence may be determined using signals including one or more of a text message, an email message, an instant message, a calendar event, a social media post, or the like.

A server may maintain an indication of token acknowledgements (e.g., a graph of connectivity) from responding devices and in response to a request from a device belonging to a first access control list, the server may return an indication of devices from the first access control list for which the server has received a token acknowledgement.

Other aspects include corresponding methods, systems, apparatus, and computer program products for these and other innovative aspects.

The disclosure may be particularly advantageous in a number of respects. First, the system can accurately determine fine grain copresence between user devices without receiving location data from the user devices. For example, the system can figure out if users are in the same room, which can be difficult using other techniques. Second, the system reduces battery drain while simulating always on performance by waking up only those devices whose fine grain copresence is to be determined.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
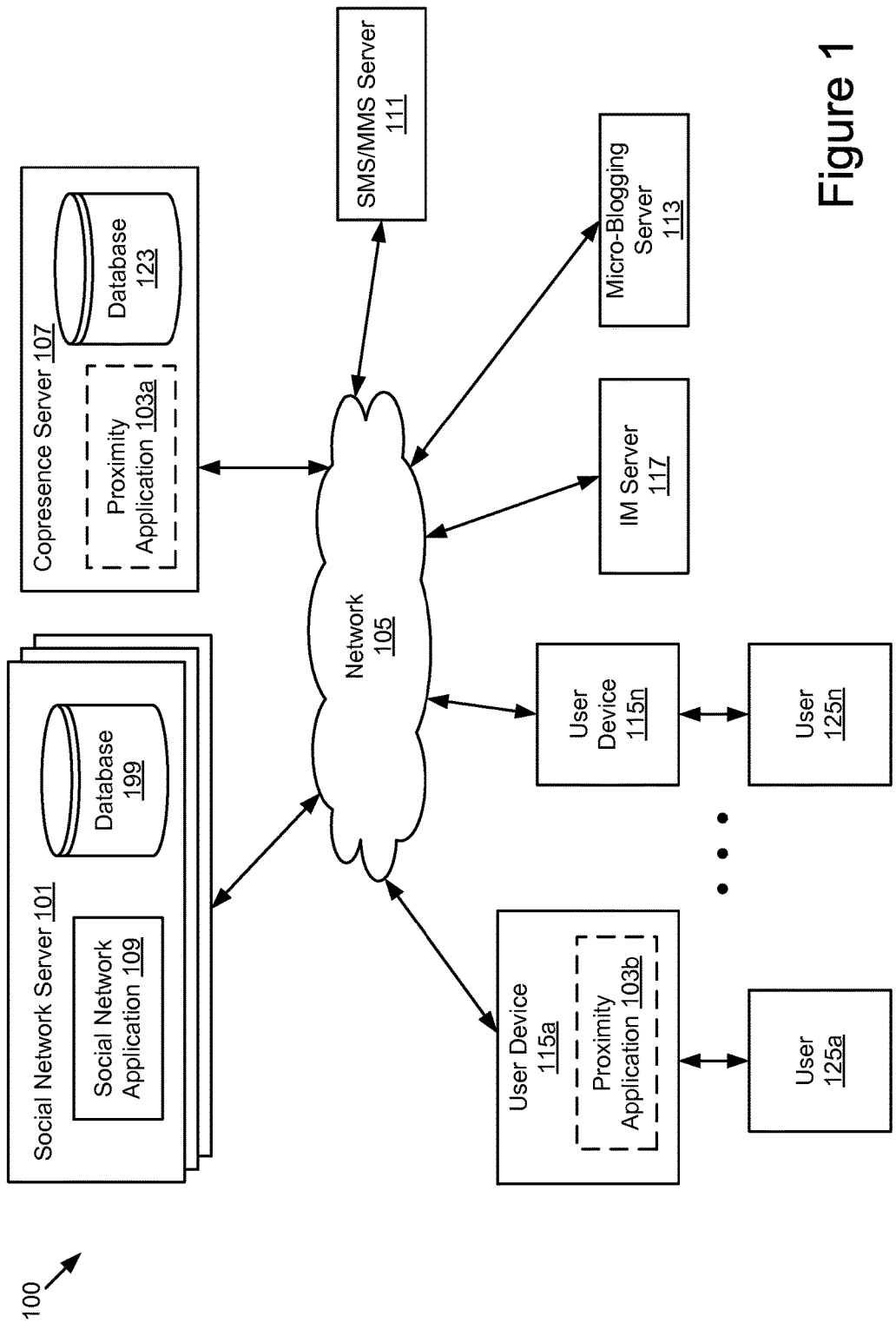
FIG. 1 illustrates a block diagram of one embodiment of a system for determining copresence of two or more users or devices.

FIG. 1 illustrates a block diagram of one embodiment of a system 100 for determining copresence of two or more users or devices. In some embodiments, determining copresence of two or more user devices may be orchestrated by one or more servers, such as copresence server 107. It should be understood that the system 100 illustrated in FIG. 1 is representative of an example system for determining copresence of two or more devices, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system may be integrated into to a single computing device or system or additional computing devices or systems, etc.

The illustrated system 100 includes user devices 115a . . . 115n that can be accessed by users 125a . . . 125n, one or more social network servers 101, a Short Messaging Service (SMS)/Multi-media Messaging Service (MMS) sever 111, a micro-blogging server 113, an Instant Messaging (IM) server 117 and a copresence server 107. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number. In the illustrated embodiment, the entities of the system 100 are communicatively coupled via a network 105. In some embodiments, the system 100 may include other servers or devices not shown in FIG. 1. For example, the system 100 may include a global positioning system (GPS) to aid in determining the coarse grain location of a user device 115.

The social network server 101 can be a hardware server that includes a processor, a memory and network communication capabilities. The social network server 101 is communicatively coupled to the network 105. In some embodiments, the social network server 101 sends and receives data to and from one or more of the user devices 115a . . . 115n and the copresence server 107 via the network 105. The social network server 101 includes a social network application 109 and a database 199. The database 199 stores social data associated with users. For example, the database 199 stores social data describing one or more of user profiles, posts, comments, videos, audio files, images, shares, acknowledgements, etc., published in a social network.

A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

Multiple social network servers 101 are illustrated and represent different social networks coupled to the network 105, each having its own server, application and social graph. For example, a first social network may be more directed to business networking, a second may be more directed to an electronic messaging application where the social graph represents communications between users, a third may be directed to a social forum, a fourth may be directed to a blogging or microblogging environment, etc.

In some embodiments, a proximity application 103a is operable on the copresence server 107, which is coupled to the network 105. The copresence server 107 can be a hardware server that includes a processor, a memory and network communication capabilities. The copresence server 107, for example, sends and receives data to and from other entities of the system 100 via the network 105. While FIG. 1 illustrates one copresence server 107, the system 100 may include one or more copresence servers 107. In various embodiments, the copresence server 107 orchestrates determination of copresence by coordinating sending and receiving fine grain copresence tokens between user devices having various transmit/receive capabilities.

In some embodiments, the copresence server 107 determines copresence of user devices 115. In one embodiment, the copresence server 107 may determine copresence in response to a request from a user device. For example, a user 125 may access an application or other program (e.g., proximity application 103) on a user device 115 and request to know what other users 125 or user devices 115 are copresent. The copresence server 107 may then initiate a process, as described in more detail below, to determine copresent user devices 115. In other embodiments, the copresence server 107 may determine copresence in response to one or more other signals. For example, the copresence server 107 may periodically determine copresence of user devices 115 at a particular location. Similarly, copresence server 107 may receive request from a stationary user device 115 (e.g., a TV) to determine if other user devices 115 are copresent. In yet another embodiment, copresence server 107 may receive request from the user device 115 that is not initiated by a user. For example, a user device 115 may be programmed to periodically request copresence information for surrounding user devices 115. While the description below references user devices in many instances using ordinal numbers, it should be understood that it is not necessary for a particular user device to perform any particular function described. For example, a user device that sends a copresence request to the copresence server does not necessarily have to be the user device that transmits a fine grain copresence token for other user devices to detect, as this may be done by any other user device under the direction of the copresence server and the requesting user device may acknowledge the fine grain copresence token.

Copresent user devices may be devices that are currently within a proximate distance to each other or within a certain area coverage proximate to one another. Copresence may be determined, for example, by determining that user devices are proximate to each other within a particular distance or area. Further, copresence may be determined on various scales defined by coarse grain copresence determination and fine grain copresence determination. For example, two copresent devices may be within a first proximate distance to each other based on coarse grain copresence determination. Furthering on this example, the two devices may be within may be within a second proximate distance to each other based on fine grain copresence determination, the second proximate distance being a distance within the first proximate distance. As another example, coarse grain copresence may be determined when user devices are proximate within a particular distance and fine grain copresence may be determined when user devices are proximate within a particular distance that is relatively smaller than the distance for determining coarse grain copresence. Coarse grain copresence may be determined using technologies having a relatively wide copresence threshold, for example, GPS techniques, Wi-Fi positioning systems, cellular network location services, or the like. On the other hand, fine grain copresence may be determined using technologies that have a relatively smaller communication area, and therefore a relatively smaller copresence threshold. For example, fine grain copresence may be determined using Bluetooth, Bluetooth Low Energy (BLE), Wi-Fi, infrared, inaudible audio signals, audible audio signals, near field communication, and the like. Additionally, the technologies used to determine fine grain copresence can be effective indoors and can even be used to determine copresence in a particular enclosed area, e.g., a room within a building. Further, determining coarse grain copresence of devices may provide and initial location identification of devices within a wider range. This determination of coarse grain location information may provide location information to determine whether the proximity of the devices may be further specified or refined through fine grain location determination, thereby determining whether the devices may communicate with each other or transmit data to one another via near-field communication technologies such as Bluetooth, Bluetooth Low Energy (BLE), Wi-Fi, infrared, inaudible audio signals, audible audio signals described above. As another example, the copresence server 107 may determine a coarse grain location (or coarse grain copresence) of user devices that are within 1000 feet of one another by GPS techniques, Wi-Fi positioning systems, cellular network location services, or other similar technologies that are operable within a relatively wide transmission or communication distance. Furthering on this example, the proximity application 103 (which determines fine grain copresence between user devices) may determine a fine grain location (or fine grain copresence) of user devices that are within 10 feet of one another by Bluetooth, Bluetooth Low Energy (BLE), Wi-Fi, infrared, inaudible audio signals, audible audio signals, near field communication, and other similar technologies that are operable within a relatively smaller transmission or communication distance. The proximity application 103 is further described below and also described in more detail with reference to FIGS. 2-5.

In some embodiments, the copresence server 107 may determine a coarse grain location (or coarse grain copresence) of user devices 115 based on signals received from other entities of the system 100. For example, the copresence server 107 may receive signals from a user device 115, the SMS/MMS server 111, the micro-blogging server 113, the IM server 117, and/or the social network server 101. Using these signals, the copresence server may determine a coarse grain location of each of the user devices 115 in communication with the copresence server 107. For example, in one embodiment, the copresence server 107 may receive a signal from a user device 115 that includes the location of the device (e.g., GPS location, wireless network determined location, etc.). Based on the coarse grain location information, the copresence server can coordinate a process to refine copresence as described in further detail below.

In the illustrated embodiment, the copresence server 107 may include a database 123 for storing data associated with the copresence server 107, e.g., coarse grain location and/or copresence information, signals received from other entities of system 100, and the like. In some embodiments, the database 123 may be a dynamic random access memory (DRAM) device, a static random access memory (SRAM) device, flash memory or some other memory devices. In other embodiments, the database 123 may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In various embodiments, one or more of the entities in the system 100 may include a proximity application 103 for use in determining fine grain copresence between user devices. The proximity application 103 includes software and/or logic executable by a processor to determine fine grain copresence between users. In some embodiments, the proximity application 103 can be implemented using hardware including a field-programmable gate array (FPGA) or an application-specific integrated circuit (ASIC). In some other embodiments, the proximity application 103 can be implemented using a combination of hardware and software. In some embodiments, the proximity application 103 may be stored in a combination of the devices and servers, or in one of the devices or servers. The proximity application 103 is described below in more detail with reference to FIGS. 2-7.

Although only two proximity applications 103a and 103b are illustrated in the example of FIG. 1, it should be understood that any number of proximity applications may be present in the entities of system 100. As described in more detail herein, the proximity application 103a may determine a set of user devices 115 that may be within proximity to a first user device 115 based on coarse grain location and/or copresence information. In one embodiment, the proximity application may further determine a subset of the user devices 115 that the user of the first user device 115 may be interested in learning are nearby. In some embodiments, the proximity application 103a determines one or more actions to perform when the other user device 115 is within proximity. For example, the proximity application 103a may initiate a notification to be displayed to the user that other user devices are nearby. Whether or not a user device will show up on a display may be customized, for example, through privacy settings on the user device.

In some embodiments, the proximity application 103 acts in part as a thin-client application that may be stored on the user devices 115a . . . 115n and in part that may be stored on the copresence server 107. For example, the proximity application 103b on the user device 115a generates a list of device identifiers associated with user devices 115 in the proximity of user device 115a, and sends the list of device identifiers to the proximity application 103a stored on the copresence server 107. The proximity application 103a determines if the user devices 115 permit their proximity to be displayed to the user 125a based on profiles or other social data of the users 125 associated with user devices 115. The proximity application 103a may then send permission data indicating permission of the users 125 to the proximity application 103b on the user device 115a for presenting the proximity of the users 125 to the user 125a based on the permission data.

User devices 115a . . . 115n are computing devices having data processing and communication capabilities. For example, the user devices 115a . . . 115n may be laptop computers, desktop computers, tablet computers, smartphones, portable game players, portable music players, e-readers, televisions, or the like. In some implementations, a user device 115 may include a processor (e.g., virtual, physical, etc.), a memory, a power source, a communication unit, and/or other software and/or hardware components, including, for example, a display, graphics processor, wireless transceivers, keyboard, camera, sensors, firmware, operating systems, drivers, various physical connection interfaces (e.g., USB, HDMI, etc.). The user devices 115a . . . 115n may couple to and communicate with one another and the other entities of the system 100 via the network 105 using a wireless and/or wired connection. While FIG. 1 illustrates two user devices 115a and 115n, the disclosure applies to a system architecture having any number of user devices 115.

In some embodiments, the user device 115 can be a wearable mobile computing device. For example, the user device 115 may be a wristband, jewelry, eyeglasses, a smart watch, or the like. The user 125 can view notifications from the proximity application 103 on a display of the user device 115. For example, the user 125 can view the notifications on a display of a smart watch or a smart wristband. The user 125 may also configure what types of notifications to be displayed on the user device 115. For example, the user 125 may configure the wearable user device 115 to blink for 5 seconds if a friend's mobile user device 115 is detected in proximity to the user 125.

In other embodiments, while referenced herein as a user device, user device 115 does not necessarily have to be associated with a user. For example, a user device 115 may be a "smart" signpost, or the like, which detects the presence of other user devices. In another example, user device 115 may be a car which can request the proximity of other cars, its proximity to a particular parking spot (e.g., the nearest available parking spot, an assigned parking spot, etc.). In yet another example, a first user device (e.g., a smart phone, tablet, or the like) may detect the presence of a second user device (e.g., TV, set-top box, game console, or the like) and turn into a remote controller for the second user device.

The network 105 may include any number and/or type of networks, and may be representative of a single network or numerous different networks. For example, the network 105 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, various combinations thereof, etc. Although FIG. 1 illustrates one network 105 coupled to the user devices 115, the social network server 101 and the copresence server 107, in practice one or more networks 105 can be connected to these entities.

The social network server 101, the copresence server 107, the SMS/MMS server 111, the micro-blogging server 113, and the IM server 117 are, in some embodiments, hardware servers including a processor, memory and network communication capabilities. While only one social network server 101, the copresence server 107, the SMS/MMS server 111, the micro-blogging server 113, and the IM server 117 are illustrated, any number of these entities may be present and coupled to the network 105. For example, the system 100 may include a first social network server and a first social graph directed towards business networking and a second social network server and a second social graph directed towards dating, etc.

Figure 2:
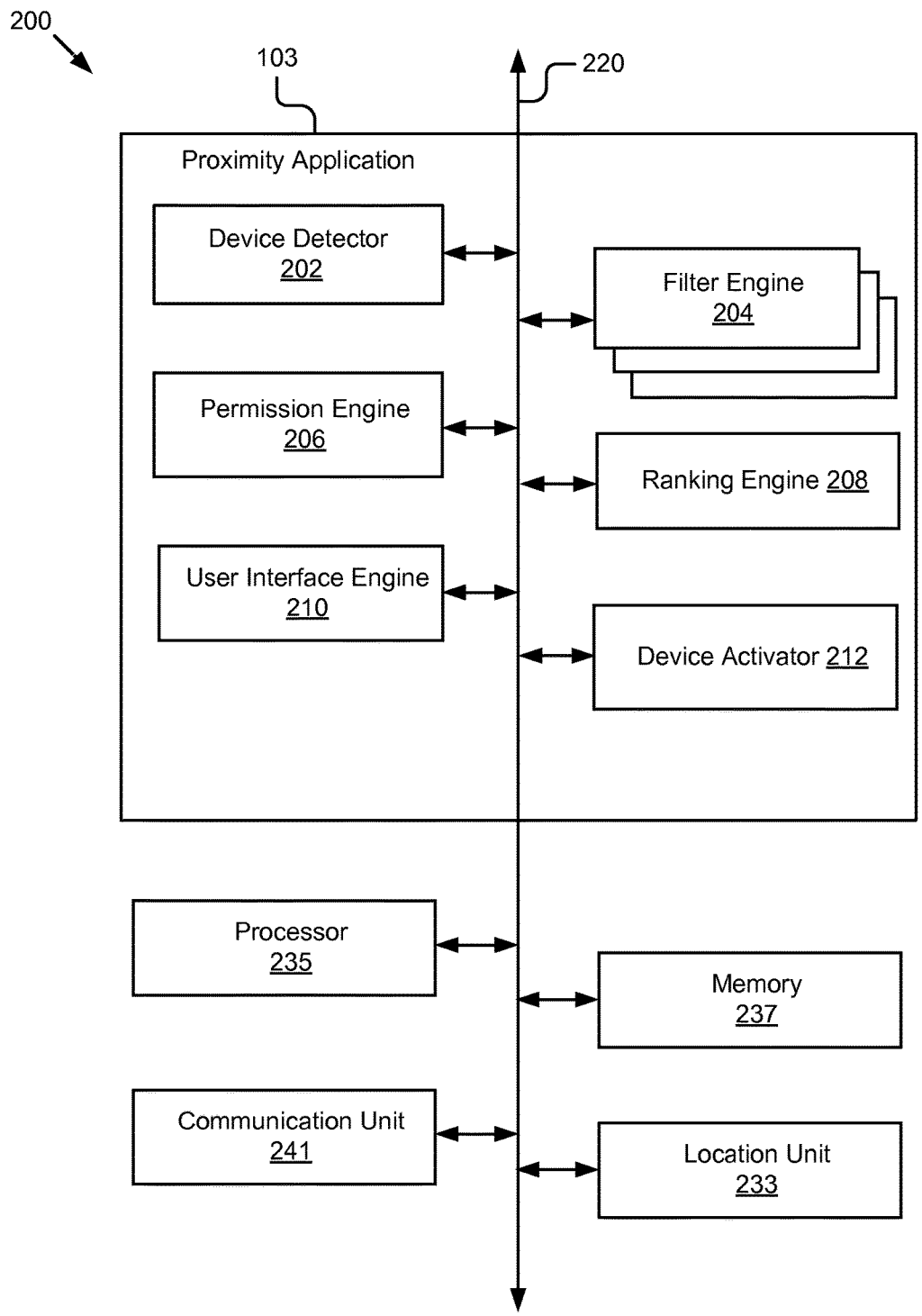
FIG. 2 is a block diagram of a computing device for determining copresence of two or more users or devices.

Referring now to FIG. 2, an example of the proximity application 103 is shown in more detail. FIG. 2 is a block diagram of a computing device 200 that includes a proximity application 103, a processor 235, a memory 237, a location unit 233, and a communication unit 241 according to some examples. The components of the computing device 200 are communicatively coupled by a bus 220. In some embodiments, the computing device 200 is similar to one of a user device 115 and a copresence server 107 as described above. The computing device 200 depicted in FIG. 2 is provided by way of example and it should be understood that it may take other forms and include additional or fewer components without departing from the scope of the present disclosure. For instance, various components of the computing device 200 may reside on the same or different computing devices and may be coupled for communication using a variety of communication protocols and/or technologies including, for instance, communication buses, software communication mechanisms, computer networks, etc.

The processor 235 may execute software instructions by performing various input/output, logical, and/or mathematical operations. The processor 235 may have various computing architectures to process data signals including, for example, a complex instruction set computer (CIBC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device (not shown), supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the proximity application 103, and the location unit 233.

The memory 237 may store and provide access to data for the other components of the computing device 200. The memory 237 may be included in a single computing device or a plurality of computing devices as discussed elsewhere herein. In some implementations, the memory 237 may store instructions and/or data that may be executed by the processor 235. For example, in one embodiment, the memory 237 may store the proximity application 103. The memory 237 is also capable of storing other instructions and data, including, for example, an operating system, hardware drivers, other software applications, databases, etc. The memory 237 may be coupled to the bus 220 for communication with the processor 235 and the other components of computing device 200.

The memory 237 includes one or more non-transitory computer-usable (e.g., readable, writeable, etc.) mediums, which can be any tangible apparatus or device that can contain, store, communicate, propagate or transport instructions, data, computer programs, software, code, routines, etc., for processing by or in connection with the processor 235. In some implementations, the memory 237 may include one or more of volatile memory and non-volatile memory. For example, the memory 237 may include, but is not limited, to one or more of a dynamic random access memory (DRAM) device, a static random access memory (SRAM) device, an embedded memory device, a discrete memory device (e.g., a PROM, EPROM, ROM), a hard disk drive, an optical disk drive (CD, DVD, Blue-Ray™, etc.). It should be understood that the memory 237 may be a single device or may include multiple types of devices and configurations.

The bus 220 can include a communication bus for transferring data between components of a computing device or between computing devices, a network bus system including the network 105 or portions thereof, a processor mesh, various connectors, a combination thereof, etc. in some implementations, the proximity application 103 operating on the computing device 200 may cooperate and communicate with other components of the computing device 200 via a software communication mechanism implemented in association with the bus 220. The software communication mechanism can include and/or facilitate, for example, inter-process communication, local function or procedure calls, remote procedure calls, an object broker (e.g., CORB), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 241 may include one or more interface devices for wired and/or wireless connectivity with the network 105 and the other entities and/or components of the system 100 including, for example, the social network server 101, the copresence server 107, the user devices 115, the SMS/MMS server 111, the micro-blogging server 113, the IM server 117, etc. For instance, the communication unit 241 may include, but is not limited to, CAT-type interfaces; wireless transceivers for sending and receiving signals using Wi-Fi™, Bluetooth®, cellular communications, etc.; USB interfaces; various combinations thereof; etc. The communication unit 241 may be coupled to the network 105 and may be coupled to the other components of the computing device via the bus 220. In some implementations, the communication unit 241 can link the processor 235 to the network 105, which may in turn be coupled to other processing systems. The communication unit 241 can provide other connections to the network 105 and to other entities of the system 100 using various standard communication protocols.

In the illustrated embodiment shown in FIG. 2, the proximity application 103 includes a device detector 202, one or more filter engines 204, a permission engine 206, a ranking engine 208, a user interface engine 210, and a device activator 212. These components of the proximity application 103 are communicatively coupled to each other via the bus 220.

The device detector 202 includes software and/or logic to provide the functionality described below for detecting and/or orchestrating determination of coarse grain and fine grain copresence of user devices 115. In some embodiments, device detector 202 can be implemented using hardware including a field-programmable gate array (FPGA) or an application-specific integrated circuit (ASIC). In other embodiments, the device detector 202 can be implemented using a combination of hardware and software executable by processor 235.

In some embodiments, the device detector 202 determines coarse grain and fine grain copresence of one or more user devices 115. For example, in one embodiment, the device detector 202 determines a coarse grain location and/or copresence for user devices 115 based on GPS techniques, Wi-Fi positioning systems, cellular network location services, or the like.

In some embodiments, the device detector 202 receives recorded locations of a user device 115 from one or more of the databases (e.g., the database 199, the database 123, etc.) and determines a coarse grain location of the user device 115. For example, the user device 115 may check-in with a social network at various locations and the database 199 may store historical locations of the device based on the check-ins. The device detector 202 may then determine a coarse grain location for the user device 115 based on historical locations of the user device 115. For example, if the user device 115 is a home device (e.g., a television, a video player, a desktop computer, etc.) and usually checked-in at home, the device detector 202 would determine the coarse grain location of the user device 115 to be near a user's home. In another example, the user device 115 may be a smartphone or other mobile device and during a certain period of time (e.g., 9 AM-6 PM on weekdays) the device is usually with the user and at the user's work place. The device detector 202 would determine the coarse grain location of the user device 115 to be at the user's work place during that certain period of time.

The device detector 202 may then refine copresence by determining fine grain copresence for user devices 115 using Bluetooth, Bluetooth Low Energy (BLE), Wi-Fi, infrared, inaudible audio signals, audible audio signals, near field communication, etc., to transmit or receive a copresence token and/or transmit or receive a response to a copresence token as described in more detail below. For example, after determining coarse grain copresence of one or more user devices 115 based, for example, on the coarse grain location information, the copresence server 107 may select a user device 115 to transmit a fine grain copresence token for determining fine grain copresence. The copresence server 107 may initiate the fine grain copresence detection by sending a signal to the transmitting user device 115. In one embodiment, the signal may be sent to the transmitting user device 115 via network 105. The copresence server 107 may also transmit a signal to a receiving user device to wake up and instruct the user device to listen for a fine grain copresence token.

In response to receiving the signal to transmit the fine grain copresence token, the device detector 202 of the transmitting user device may initiate transmission of the fine grain copresence token using the transmission unit 241. As described above, the transmitting user device may transmit the token using Bluetooth, BLE, Wi-Fi, infrared, inaudible audio, audible audio, near field, or other signals with similar range. In response to detecting the fine grain copresence token, the device detector 202 of the receiving user device may transmit a confirmation or acknowledgment to the transmitting user device. After receiving the confirmation or acknowledgment, the device detector 202 of the transmitting user device may transmit an indication to the copresence server 107 that the transmitting user device and the receiving user device are copresent. In one embodiment, there may be more than a single receiving user device that receives the fine grain copresence token and transmits a confirmation to the transmitting user device. The indication transmitted to the copresence server 107 may then include a list or other representation of copresent user devices.

In some situations, not all copresent devices 115 may be able to transmit and/or receive using a particular data transmission method or communication technology (e.g., Bluetooth, Bluetooth Low Energy (BLE), Wi-Fi, infrared, inaudible audio signals, audible audio signals, near field communication, etc.). Thus, in order to detect as many devices as possible, the server may initiate a second device 115 to transmit another fine grain copresence token or another fine grain copresence token using a second data transmission method or communication technology. In some embodiments, the transmitting device may be limited to transmit on a particular channel, mode, or using a particular communication technology. In order to optimize operation of nearby devices and conserve their power, the receiving devices may be instructed by the server to only search for the copresence token using the channel, mode, or communication technology that the transmitting device has the capability to broadcast. For example, if a transmitting device can only broadcast via BLE and audio, the server may instruct nearby devices to listen for the fine grain copresence token on the audio and BLE channels. Nearby devices are not instructed to scan using another data transmission method or communication technology (e.g., Bluetooth) that can consume power of the nearby devices having only the capability to communicate via the other technology without refining copresence information.

In some embodiments, the devices that are determined to be located near each other based on coarse grain location information may have very different data transmission or communication capabilities. Since each of the devices may be in communication with the server, the server can orchestrate which capabilities of each devices are used to determine copresence. More specifically, the server can identify devices with greater data transmission or communication capabilities, and employ the capabilities of those devices to identify additional devices that are copresent. For example, if an initiator device, e.g., device A which may have Bluetooth Low Energy (BLE) capability but not regular Bluetooth capability, is doing a nearby query, device A may not be able to broadcast its token to devices only having regular Bluetooth capability. However, another nearby device, e.g., device B, may be able to broadcast a token to other nearby devices using Bluetooth. Once a nearby device, e.g., device B, has acknowledged receiving a fine grain copresence token (e.g., the token transmitted by device A), the server can instruct device B to broadcast another token (which could be the same as the token used by device A) or broadcast another token via Bluetooth to give devices capable of only regular Bluetooth a chance to detect the token. Similarly, a device that detects the other device's token (e.g., via audio or other data transmission communication technologies discussed herein), could then be told by the server to make that same token or another token available via BLE. Thus it should be understood that based on the types of devices that are determined to be nearby in the first pass (i.e., based on coarse grain location information), any of their capabilities may be used in the second pass to send the token along to any unknown other nearby device using any communication medium available to any of the nearby devices. In one embodiment, the server maintains a list of devices and capabilities of each device, and a blacklist for communication capabilities. This list may be used to determine which devices to wake up and/or request to initiate the fine grain copresence detection. For example, if a particular device has poor Bluetooth functionality the server will not request that device to transmit or detect a token using Bluetooth.

In some embodiments, the copresence server 107 may orchestrate concurrent transmission of multiple fine grain copresence tokens on an audio channel using code division methods. Multiple devices with speakers can also rebroadcast a token or broadcast different tokens—even over top of each other—using code division methods. For example, the server may instruct each broadcasting device what code to use so that the tokens broadcast by each device do not collide. A variation of this may be to allow multiple audio broadcasters to broadcast different tokens (e.g., if different users in the same physical space want to do a nearby query at the same time). The server may keep track of which code divisions it had allocated in which locations.

In some embodiments, the device detector 202 on the copresence server 107 generates a token (for example after registration with the proximity application 103) and permanently assigns the token to the user device 115. In other embodiments, the device detector 202 on the copresence server 107 periodically issues new tokens so that the tokens are also not misused. In yet other embodiments, a token may be temporarily assigned to a user device 115 for the duration of a fine grain copresence determination and then recycled by a different user device for use in a separate fine grain copresence determination. In other embodiments, the device detector 202 on the user device 115 generates its own token (e.g. one time or periodically) and transmits the token to the copresence server 107 for identification purposes. The device detector 202 transmits the token to the communication unit 241 on the user device 115 to be used in the discovery process with other user devices 115. In some embodiments, a token is a random set of bits sufficient to ensure uniqueness and security (e.g., 48 bits), not-guessable, and have a server-enforced lifespan (e.g., 10 minutes). In some embodiments, a token may be a proxy identifier for the location and time a user device requested the token, with some smearing on both since the user device can move during the enforced lifespan. In one embodiment, a single device may be allowed to broadcast a particular token and only for the server-enforced lifespan of that token. Within in the server enforced lifespan of a token, the copresence server 107 may guarantee the token to be unique. However, as described above, a token may be recycled—assigned to another user device 115—after the token's server-enforce lifespan has passed.

In some embodiments, the device detector 202 wakes up all other user devices 115 within a possible communication range of the first device, based on coarse grain location and/or copresence information, to listen for the fine grain copresence token. In some embodiments, the device detector 202 may wake up only a subset of user devices 115 within range of the first user device 115 due to the memory limitations, communication technology limitations, and/or battery life limitations. Criteria may be specified by a user or determined by the copresence server 107 for selecting the subset of user devices to wake up. Example criteria can include social connections between users, common interests based on user profiles or activities, a historical status of devices, signals from other applications, etc. For example, although the copresence server 107 maintains or has access to coarse grain location and/or copresence information for a large number of user devices, it is not necessary to involve all user devices that are roughly copresent based on this information in fine grain copresence detection. In some embodiments, the filter engines 204 or the list generator 206 may determine which user devices to wake up for fine grain copresence detection based on one or more of the certain criteria (e.g., the user of the first user device 115 may know the users associated with the list of other user devices 115). In other embodiments, the device detector 202 receives a list of other user devices 115 filtered by the permission engine 208 that are within proximity to the first user device 115 to wake up for fine grain copresence detection. In some other embodiments, the device detector 202 receives a list of other devices filtered by the ranking engine 212 and wakes up those user devices in the list. For example, the ranking engine 212 may pick the top 50 users in a list and the device detector 202 wakes up the top 50 user devices 115 for fine grain copresence detection.

In some embodiments, not all copresent devices may respond to a particular token transmission. However, the copresence server 107 may still determine copresence based on separate copresence determination requests. For example, if the copresence server 107 determines that user A and user B are copresent in a first copresence determination request and that user B and user C are copresent in a second copresence determination request, the copresence server 107 can assume or infer that user A and user C are copresent. In general, there is no limit to the degree of separation the copresence server 107 may rely on in determining copresence based on separate copresence determination requests. However, if too many degrees of separation are present copresence determinations may become unreliable and/or less useful. For example, at a large sporting event, the copresence server 107 may determine copresence of all user devices in the stadium based on multiple copresence determination requests and large degrees of separation. However, copresence information would be more useful if the copresence determination result was limited to one or two degrees of separation from the requester.

In some embodiments, it may be advantageous to persist or reuse tokens in a nearby vicinity for increased efficiency, reduced resource use, improved battery life, and reduced network calls. For example, if two groups of users with corresponding devices (devices A, B, C and D) are at a restaurant at different tables (e.g., devices A and B are at a first table and a first group, and devices C and D are at a second table and a second group), the server will allow the second group (devices C and D) to "piggy-back" on or reuse the copresence token of the first group (devices A and B). A first device (e.g., device A) transmits a copresence determination request to the server, receives a token from the copresence server, and broadcasts the token to detect other nearby devices. The server sends a signal to wake up the remaining devices (devices B, C, and D) in the restaurant. All of the devices (devices A, B, C, and D) at both tables acknowledge the token, but they do so in an Access Control List (ACL'd) way. For example, the devices may belong to one or more ACLs (i.e., groups) on the server and the server keeps track of which devices in which ACL have acknowledged the token.

The copresence server 107 may receive a second copresence determination request (e.g., from device C in the second group) to know which devices in a particular ACL to which device C belongs are copresent. Instead of repeating the process of waking up all of the nearby devices, transmitting a token from the server, and then rebroadcasting the token, which remaining devices A, B, and D will acknowledge, the token previously used for the first request by device A can just be reused. This eliminates the additional processing and power consumption of devices A, B, C and D. While this concept has been described with two small groups of devices, it should be understood that it can be extrapolated for other contexts including tens or hundreds of devices.

In some embodiments, after receiving responses from other user devices, the device detector 202 may send information about the responding user devices 115 to the filter engines 204, the list generator 206, the permission engine 208, or the ranking engine 212 for filtering the list of responding user devices 115 for display on the one or more of the user devices 115.

The filter engines 204 includes software and/or logic to provide the functionality described below for filtering user devices 115 based on certain criteria and generating a list of filtered devices. In some embodiments, filter engines 204 can be implemented using hardware including FPGAs or ASICs. In other embodiments, the filter engines 204 can be implemented using a combination of hardware and software executable by processor 235. The filter engines 204 may be adapted for cooperation and communication with the processor 235 and other components of the computing device 200.

In some embodiments, one or more of the filter engines 204 can determine social connections between users based on social networks, filter user devices 115 based on user connections and generate a list of filtered devices. For example, one or more of the filter engines 204 receive social data (e.g., profiles, relationships, a social graph, etc.) from one or more social networks and determine if and how users are connected. In some embodiments, one or more of the filter engines 204 can authenticate with different social networks. In some embodiments, one or more of the filter engines 204 can define a common standard for determining user connections. For example, one or more of the filter engines 204 define a first-degree connection as a first user following a second user, the first user and the second user being friends, the first and second users being part of a group on a social network, etc. The one or more filter engines 204 can filter user devices 115 by omitting user devices 115 from the set of other user devices 115 whose users have no connections to the user associated with the first user device 115. This type of filter engine 204 can be referred to as a social connection filter engine 204. For example, a social connection filter engine 204 residing in a user device 115 operated by a first user 125a filters out user devices 115 used by second users 125 having a threshold degree of social connections with the first user 125a. For example, the social connection filter engine 204 can remove other user devices 115 from the set of other user devices 115 where the user associated with the first device 115 has two or fewer degrees of connection to the users associated with the other user devices 115 used by the second users 125 having no social connections with the first user 125a from a list and keep the user devices 115 whose users 125 have social connections with the first user 125a in the list.

In one embodiment, the social connection filter engine 204 determines a type and a level of social connection between users and filters from the set of other user devices 115 based on the type and the level. Type includes, for example, different foundations for the social connection such as friend, co-worker and family. Level includes, for example, different gradations within the same type. For example, users can be acquaintances, good friends or best friends. In other embodiments, the type and the level are also used by the ranking engine to rank user devices 115 within the list of filtered devices.

In some embodiments, the social connection filter engine 204 can determine user connections based on other types of sources for social relationships. For example, besides the social networks described above, the sources for social relationships can also include emails, micro-blogs, blogs, forums, user contact lists, corporate employee databases, organizational charts, etc. For example, the social connection filter engine 204 can determine if users are connected by checking users' contact lists or by determining if users have sent or received a certain number of emails (e.g., one email, five emails, 10 emails, 50 emails, etc.) to or from each other in a certain period of time (e.g., in a week, in a month, in a year, etc.). In another example, the social connection filter engine 204 can determine user connections by analyzing corporate employee databases or school alumni databases, etc. For example, the social connection filter engine 204 determines that users are connected if they have worked for the same employer or if they have studied at the same school.

In some embodiments, the filter engines 204 can include filter engines 204 that identify people who are connected implicitly by something they share in common. The different types of filter engines 204 operate individually or cooperate with each other to filter the user devices 115 based on certain criteria. In one embodiment, a profile or interest filter engine 204 can filter user devices 115 based on user profiles or interests. For example, a profile or interest filter engine 204 receives a user's profile and/or data describing user activities, determines the user's characteristics (e.g., interests, affiliations, etc.) based on the user's profile and/or activities and filters other user devices 115 for displaying to the user based on the user's characteristics. For example, a first user's profile indicates that the first user is part of a parenting and motorcycling communities; a profile or interest filter engine 204 determines that the first user might be interested in parenting and motorcycling and thus selects user devices 115 used by second users who are also interested in either of the parenting and motorcycling. In another example, for a dating app, a profile or interest filter engine 204 can find candidate users using user devices 115 within proximity of a user device 115 used by a searching user based on their profiles on the dating app. For example, the candidate users' profiles match or are relevant to the profile of the searching user; the profile or interest filter engine 204 filters out other users whose profiles are not relevant to the profile of the searching user even though the other users are also in proximity of the searching user. In this way, the searching user can be saved a significant amount of time for picking candidates from the list of user devices 115 used by users within proximity, especially when the list is substantially long. The searching user can be provided other users nearby without giving out personal information (e.g., phone number, etc.).

The profile or interest filter engine 204 can also determine user characteristics based on user activities. Example user activities include, but are not limited to, physical activities (e.g., running, walking, sleeping, driving, talking to someone, biking, talking to a group, hiking, etc.), activities on social networks (e.g., playing online games on a social network, publishing posts and/or comments, acknowledging posts, sharing posts, etc.) and activities on user devices 115 (e.g., opening an application, listening to a playlist, calling a contact, writing emails, viewing photos, watching videos, etc.). Other example activities are possible. By analyzing the user activities, the profile or interest filter engine 204 can determine a first user's hobbies or interests and filter other users to select a set of second users who have the same or relevant hobbies or interests for introduction to the first user when they are within proximity of each other.

In one embodiment, one filter engine 204 can filter user devices 115 for a user based on a signal indicating that the user devices 115 will be in physical proximity to the user device 115. For example, the filter engine 204 (referred to as a "signal filter engine 204") selects the user devices 115 that have checked in to the server (e.g., the copresence server 107, the social network server 101, etc.) within in a certain distance (e.g., 0.5 mile, one mile, two miles, etc.) from a first user's location and within a certain time range (e.g., in the past 10 minutes, in the past two hours, etc.). The signal that the user devices 115 have checked in to the server within a certain distance from the first user's location within in a certain time range indicates that the user devices 115 will likely be in physical proximity to the first user device 115.

In one embodiment, one filter engine 204 can filter user devices 115 for a first user based on a threshold of interactions between the first user associated with the first user device 115 and a second user associated with one or more of the other user devices 115. For example, the filter engine 204 filters the set of user devices 115 for one or more second users that the first user has had reciprocal messaging with (i.e. the first user contact the second user and the second user contacted the first user) or the first user meets or contacts the second user at a certain frequency (e.g., at least once a week, etc.). The frequency can be determined in conjunction with the device detector 202, which defines contact as being within a certain proximity (e.g. the same room). This establishes the foundation for defining situations such as people who get together for lunch every week. For example, a first user would find it helpful to be notified of a second user being within proximity if they were frequent lunch companions.

In some embodiments, a geographic filter engines 204 filters user devices 115 based on their geographic locations. For example, the geographic filter engine 204 receives recorded location data for user devices 115 from the database 123 and determines a subset of the user devices 115 based on their last recorded locations.

In one embodiment, the filter engine 204 filters the set of other devices 115 based on other user devices 115 that have interacted with a first user device 115 most recently. For example, the filter engine 204 constructs a filtered list that includes second user devices 115 sending at least 10 instant messages to a first user device 115 in the past week and the filter engine 204.

In one embodiment, the filter engine 204 generates a filtered list including second user devices 115 that are frequently around a first user device 115. For example, if one or more second devices 115 are near a first user device 115 for certain times or more (e.g., five times, 10 times, etc.), the filter engine 204 generates a filtered list including the one or more second user devices 115 for the device detector 202 to query.

In some embodiments, the filter engine 204 generates a filtered list of user devices 115 by cross-referencing one or more likelihood maps. In some embodiments, the filter engine 204 receives a signal from a GPS device embedded in or coupled to a user device 115. The GPS signal can indicate that certain other user devices 115 may be within proximity. The filter engine 204 generates a list of user devices 115 by referencing the GPS signal. In some embodiments, the filter engine 204 generates a list of user devices 115 based on a software update through a server. For example, a user updates software on the user device 115 through the social network server 101; the filter engine 204 receives a signal indicating the phone software update and generates a list based on the signal. In some embodiments, the list generator 206 uses social network check-ins to generates a suggestion list of devices to ping for. For example, the social network check-ins indicate that friends of a first user are within the proximity of the first user; the filter engine 204 generates a suggestion list of user devices 115 associated with the friends to query. In some embodiments, the filter engine 204 receives a Wi-Fi signal and confirms a list of user devices 115 within proximity based on the Wi-Fi signal.

In some embodiments the filter engines 204 generate an aggregated filtered list from the filtered lists of multiple filter engines 204. For example, the top five picks for each filtered list are aggregated and duplicates are removed.

In some embodiments, the filter engines 204 are stored on the copresence server 107 and provide a filtered list to a device detector 202 stored on the first user device 115, which pings the user devices 115 on the filtered list. In another embodiment, the filter engines 204 transmit the filtered list to the permission engine 206 on the first user device 115 and the permission engine 206 transmits a list of filtered user devices 115 that the device detector 202 has permission to ping. One skilled person in the relevant art will recognize that other types of filter engines are possible to implement filtering user devices 115 for a user.

The permission engine 206 includes software and/or logic to provide the functionality described below for allowing users to configure privacy settings. In some embodiments, permission engine 206 can be implemented using hardware including FPGAs or ASICs. In other embodiments, the permission engine 206 can be implemented using a combination of hardware and software executable by processor 235. The permission engine 206 may be adapted for cooperation and communication with the processor 235 and other components of the computing device 200.

In some embodiments, the permission engine 206 allows users to select which other users (or user devices) or which type of other users can learn of the user's copresence. For example, the permission engine 208 cooperates with the user interface engine 210 to provide a user interface for a first user to give permission to one or more other users to detect the first user's copresence. In some embodiments, the permission engine 208 can generate suggestions for a first user about other users to be given permission based on the first user's social connections and provide the suggestions to the first user through the user interface. For example, the permission engine 208 provides the first user with the option of permitting types of connections (e.g., friends, family, etc.) in a certain social network to detect the first user's proximity. In some embodiments, the permission engine 208 receives an input from a first user specifying other users allowed to detect the first user's proximity and configures privacy settings (e.g., access control lists) for the first user device 115 specifying the other users allowed to detect the first user device 115. In some embodiments, the permission engine 208 notifies the first user and the permitted other users or obtains their confirmations before configuring privacy settings for the first user device 115. For example, the permission engine 208 cooperates with the server (e.g., social network server 101, copresence server 107, etc.) to generate emails to send to the first user and the permitted other users for notification or confirmation.

The ranking engine 208 includes software and/or logic to provide the functionality described below for generating a ranked list of users and their proximity. In some embodiments, ranking engine 208 can be implemented using hardware including FPGAs or ASICs. In other embodiments, the ranking engine 208 can be implemented using a combination of hardware and software executable by processor 235. The ranking engine 208 may be adapted for cooperation and communication with the processor 235 and other components of the computing device 200.

The ranking engine 208 receives a filtered list of second user devices 115 from the device detector 202 that are within proximity of the first user device 115. The ranking engine 207 ranks the second user devices 115 within the filtered list based on certain criteria. Example criteria can include social connections between users, common interests based on user profiles or activities, a historical status of devices, signals from other applications, etc. In one embodiment, the ranking engine 208 ranks the second user devices 115 based on their physical distances to the first user device 115, and generates a ranked list of the second user devices 115. In another embodiment, the ranking engine 208 ranks the second user devices 115 based on their social connections to the first user. For example, the second users with a first-degree social connection to the first user appear higher in the ranked list than second users with a second-degree social connection. In yet another embodiment, the ranking engine 208 ranks the second user devices 115 based on a combination of the physical distance and the social connection to the first user. For example, the ranking engine 208 assigns weights to the two factors (physical distance and social connection) based on a certain algorithm and calculates ranking scores for the second user devices 115 by applying the weights. In this way, a second user who has a closer social connection to the first user (e.g., family) than other users (e.g., friends, followers, etc.) may appear higher in the ranked list even if the second user is physically farther away from the first user than other users ranked lower. The ranking engine 208 instructs the user interface engine 210 to generate graphical data for displaying the ranked list.

In some embodiments, the ranking engine 208 rearranges an order of the second user devices 115 in the filtered list for a first user based on a current context of the first user and/or the second users. For example, the for a user device 115 may describe a time, a location, an ongoing action, and/or a possible future action (e.g., an action in 30 minutes, etc.) associated with the user. In some embodiments, the copresence server may also receive signals from user devices 115, servers and/or databases (e.g., social signals indicating the user's current social activities, etc.) and determine a context based on the signals. For example, if the copresence server 107 determines a context that the first user is participating in a professional convention, the ranking engine 208 ranks the first user's coworkers and business partners higher in the list. In another example, if the device detector 202 detects that the first user left work and is in a bar, the ranking engine 208 ranks the first user's friends higher than business partners or clients.

In some embodiments, the ranking engine 208 picks a certain number of top user devices 115 in the list based on the ranking. For example, the ranking engine 208 picks the top 100 users from the list. In another example, the ranking engine 208 picks the top 10 users from the list of 50 users and cycles the list in case the context changes. For example, at the end of each day the list can be cycled and the ranking engine 208 re-ranks the list based on the new context.

The user interface engine 210 includes software and/or logic to provide the functionality described below for generating graphical data for providing user interfaces to users. In some embodiments, user interface engine 210 can be implemented using hardware including FPGAs or ASICs. In other embodiments, the user interface engine 210 can be implemented using a combination of hardware and software executable by processor 235. The user interface engine 210 may be adapted for cooperation and communication with the processor 235 and other components of the computing device 200.

Figure 8:
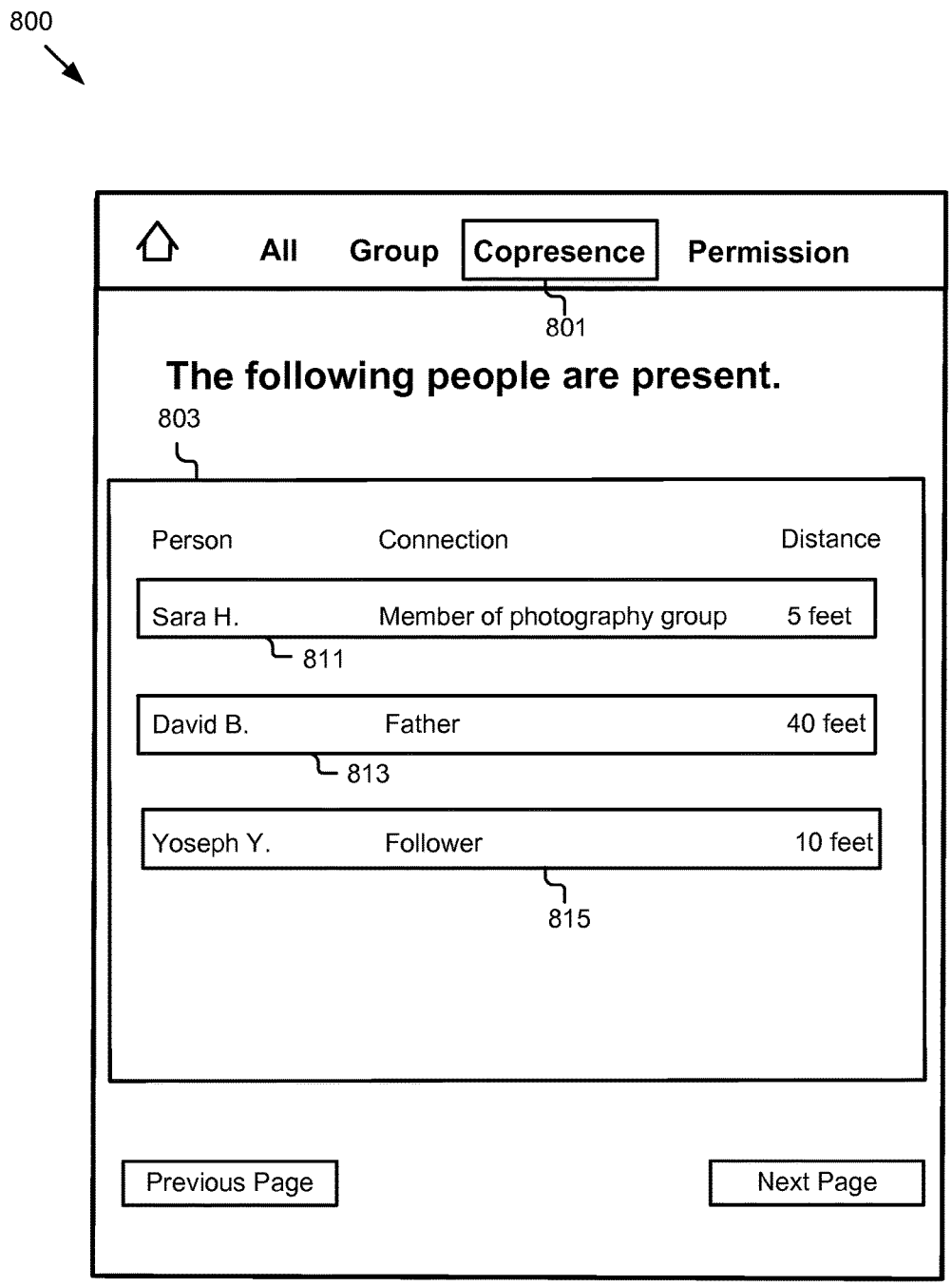
FIG. 8 is a graphic representation of an example user interface generated by the user interface engine for providing a user with copresence of other users.
Figure 9:
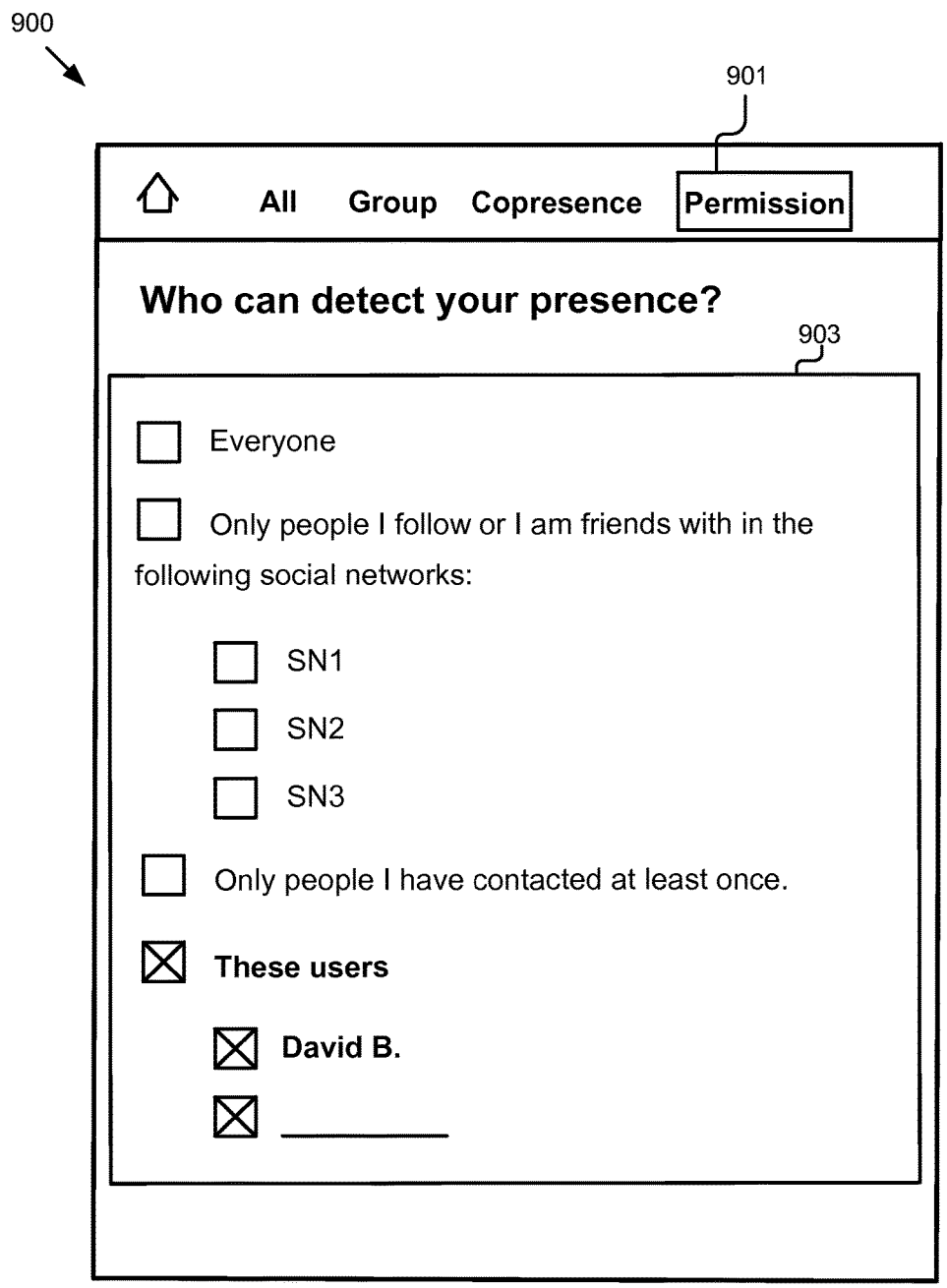
FIG. 9 is a graphic representation of an example user interface generated by the user interface engine in which a user can permit others to detect the user's copresence according to one embodiment.

In some embodiments, the user interface engine 210 generates graphical data for providing a user interface to a first user device 115 for displaying a list of second user devices 115 copresent with the first user device 115. The user interface engine 210 receives instructions from the device detector 202 if the filtered list is unranked or from the ranking engine 208 if the data is a ranked list. The user interface engine 210 sends the graphical data to the first user device 115, causing the first user device 115 to present the user interface to a user operating on the first user device 115. In some embodiments, the user interface engine 210 receives instructions from the permission engine 206 to generate graphical data for providing a user interface that allows a user to permit other users to detect the user device's 115 copresence. The user interface engine 210 may generate graphical data for providing other user interfaces to users. Example user interfaces are shown in FIGS. 8-9.

The device activator 212 includes software and/or logic to provide the functionality described below for performing actions based on copresence of user devices. In some embodiments, device activator 212 can be implemented using hardware including FPGAs or ASICs. In other embodiments, the device activator 212 can be implemented using a combination of hardware and software executable by processor 235. The device activator 212 may be adapted for cooperation and communication with the processor 235 and other components of the computing device 200.

In some embodiments, the device activator 212 controls a user device 115 to perform certain actions when receiving a signal indicating that the user device 115 is copresent with another user device. For example, a device activator 212 residing in a first user device 115 activates an application on the first user device 115 or pre-loads certain content on the first user device 115 when a second user device 115 of a user is copresent with the first user device 115. For example, as described above, the user device activator may initiate display of copresent devices for presentation to a user of the first user device.

In one embodiment, after determining copresence, the device activator 212 may initiate loading or pre-loading of content on a copresent device. For example, a user is heading home with a first user device 115. The user also has a second user device at home. After determining fine grain copresence between the first and second user devices as described herein, the second user device may turn on certain applications or pre-load certain content (e.g., music, videos, etc.) so that the user can use the applications or consume the content without waiting. In another example, the second user device may be located in a vehicle (e.g., a car) of a user and may pre-load certain content (e.g., a map, music, etc.) for the user to consume without delay.

In another embodiment, the second user device 115 may reside in a store and pre-load a user's information on the second user device 115 when the first user device, carried by the user, is copresent with the second user device. For example, a user's information can include the user's profile, the user's history of visits to the store, the user's historical shopping records in the store, the user's actions in the store, the user's membership information, etc.

In another embodiment, a device activator 212 can load information about the destination on the user device 115 (e.g., a phone) of the user when the user is copresent with a user device associated with the destination. For example, when the user device 115 detects copresence with a user device associated with the shopping mall, the device activator 212 residing on the user device 115 may load mall information (e.g., maps of the stores, coupons, etc.) on the user device 115. Alternatively, a user device 115 residing in the shopping mall can detect copresence of the user device 115 (e.g., a cell phone) and the user device 115 in the mall may send mall information to the user device 115 (e.g., via the copresence server 107, or via direct message). The device activator 212 may then load the mall information on the user device 115.

Figure 3:
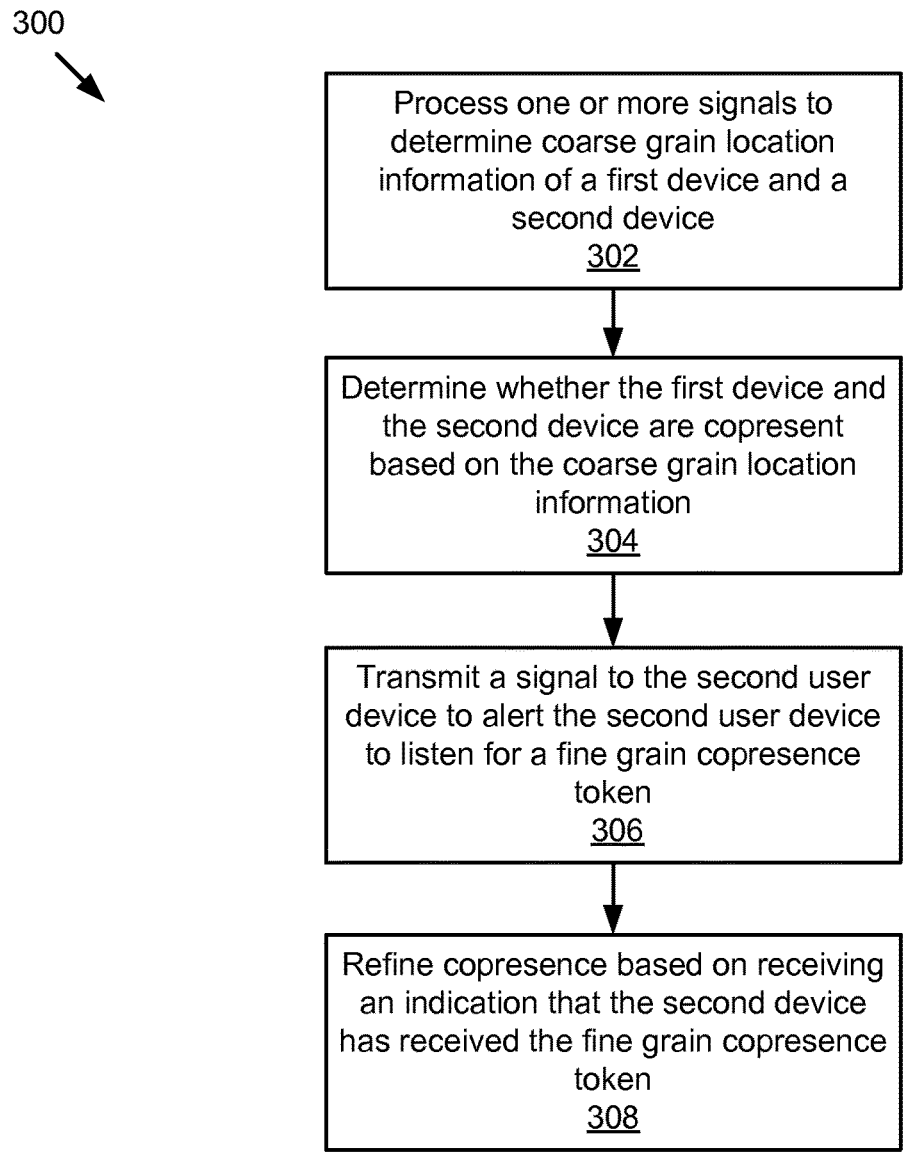
FIG. 3 is a flowchart of an example method for determining fine grain copresence between user devices.

FIG. 3 is a flowchart of an example method 300 for determining fine grain copresence between user devices 115. At 302, the copresence server 107 processes one or more signals to determine coarse grain location information of a first user device and a second user device. For example, as described above, the copresence server 107 may determine coarse grain copresence based on GPS, Wi-Fi, or cellular network signals. In other embodiments, the copresence server 107 may determine coarse grain copresence based on the contents of a text message, an email message, an instant message, a calendar event, or a social media post associated with the first device and the second device. In some embodiments, coarse grain copresence may be determined by user devices 115 performing periodic Wi-Fi scans. When the Wi-Fi environment that two or more user devices 115 detect is similar enough, the copresence server 107 may determine that the two or more user devices 115 are copresent, in a coarse grain sense.

At 304, the copresence server 107 determines whether the first device and the second device are copresent based on the coarse grain location information. For example, the copresence server 107 may determine that two devices are copresent based on coarse grain location information when the first and the second device are within a threshold distance of each other. If location information is not available, the copresence server 107 may determine coarse grain copresence from the context of the text messages or other signals.

At 306, the copresence server 107 transmits a signal to the second user device to alert the second user device to listen for a fine grain copresence token. In some embodiments to preserve battery life, user devices 115 are not persistently listening or attempting to detect fine grain copresence tokens. Therefore, when the copresence server 107 wants to determine copresence with a particular user device, the copresence server 107 may send a wake up signal to the user device to listen for a fine grain copresence token. This behavior simulates always on fine grain copresence detection without the detrimental effects on battery life.

At 308, the copresence server 107 refines copresence based on receiving an indication that the second device has received the fine grain copresence token. In one embodiment, the second device transmits a response to the first device including the fine grain copresence token to indicate that the second device has received the fine grain copresence token and is therefore copresent, in a fine grain sense, with the first user device. In another embodiment, the second user device transmits an acknowledgment to the first user device that the fine grain copresence token has been received. The first user device may then transmit the indication that the second user device has received the fine grain copresence token to the copresence server 107 and the copresence server may refine copresence based on the indication. The copresence server 107 may store refined fine grain copresence information in a data store such as database 123.

Figure 4:
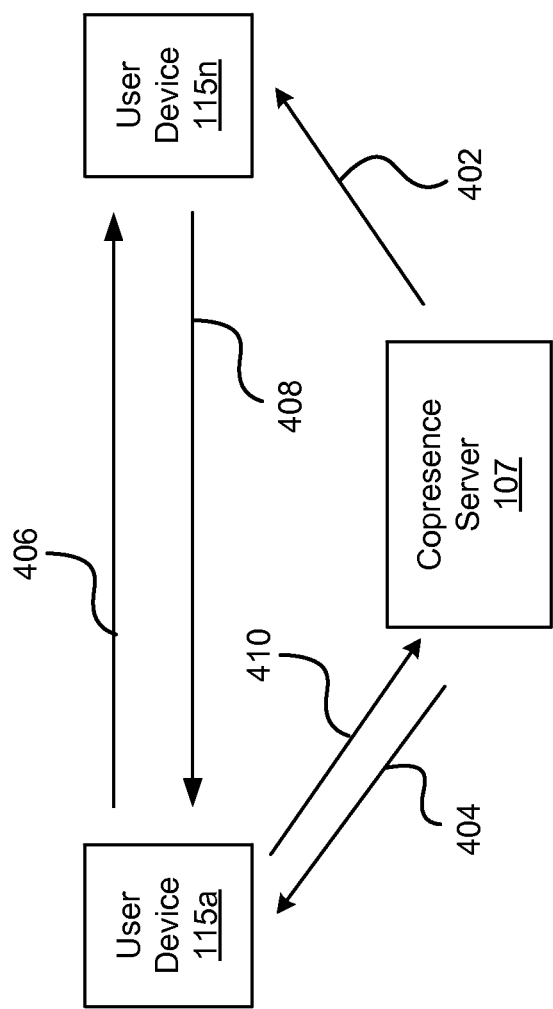
FIG. 4 is an example block diagram depicting signals transmitted and received grain one embodiment for determining fine grain copresence of user devices.

FIG. 4 is an example block diagram depicting signals transmitted and received according to one embodiment for determining fine grain copresence of user devices. As described herein, the copresence server may transmit a wake up signal 402 to user devices to be included in the fine grain copresence determination, such as user device 115*n*. The copresence server 107 also transmits a signal 404 to the transmitting user device, for example user device 115*a*, to initiate transmission of a fine grain copresence token. The signal 404 may include the fine grain copresence token as described above or the signal may include instructions to generate a fine grain copresence token.

In response to receiving the signal 404, the transmitting user device broadcasts the fine grain copresence token 406 for detection by the other user devices woken by signal 402. User devices that detect the fine grain copresence token respond with an acknowledgment 408. In one embodiment, the acknowledgment 408 includes the fine grain copresence token. The transmitting user device may aggregate identifiers of user devices that have responded with an acknowledgment 408 and transmit 410 the identifiers to the copresence server 107.

Figure 5:
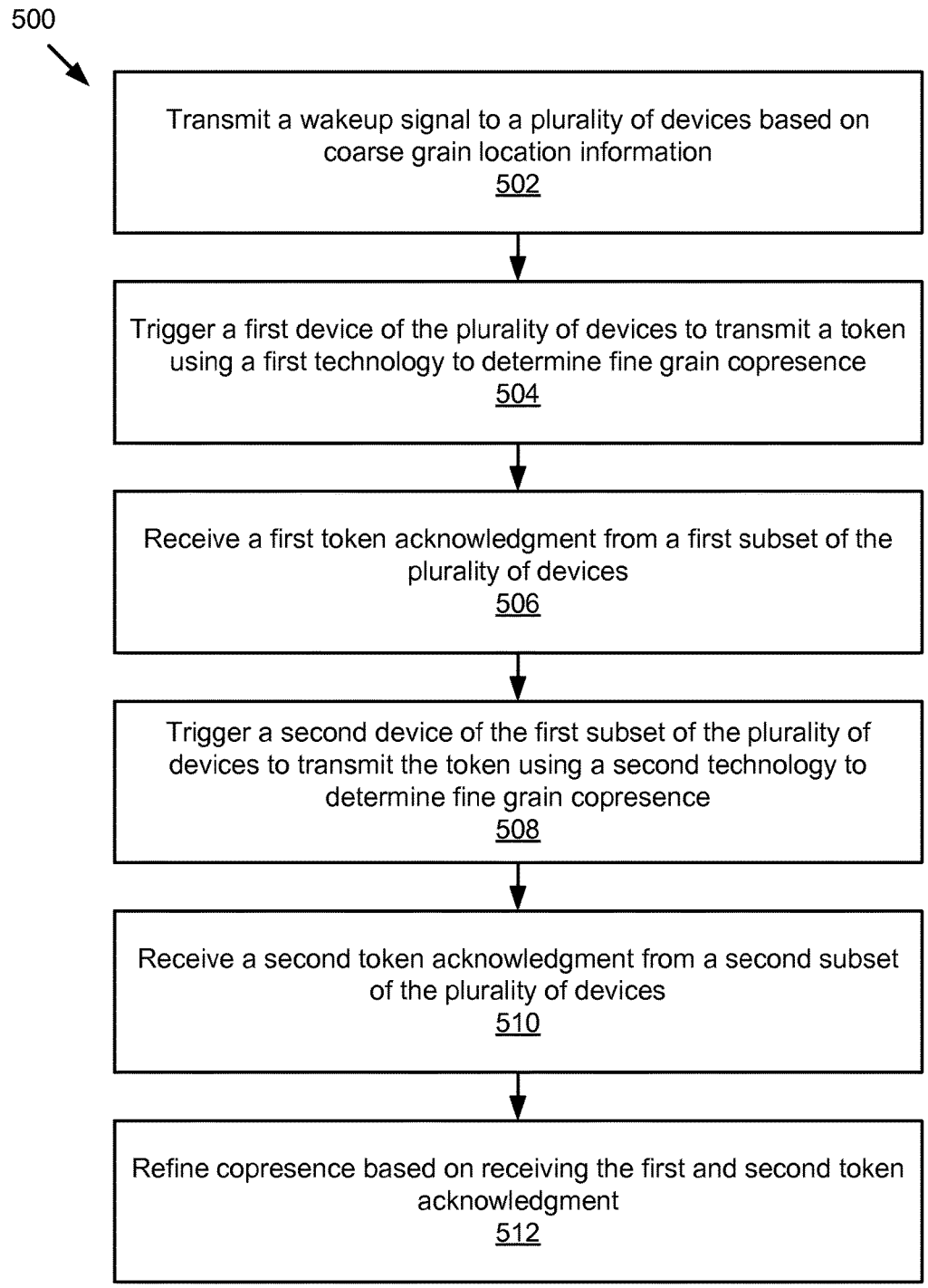
FIG. 5 is a flowchart of an example method for orchestrating fine grain copresence detection between user devices.

FIG. 5 is a flowchart of an example method for orchestrating fine grain copresence detection between user devices. At 502, the copresence server 107 transmits a wake up signal to a plurality of devices based on coarse grain location information, for example, as described in more detail above. At 504, the copresence server 107 may send a request to a first device of the plurality of devices to transmit the token using a first communication technology to determine fine grain copresence. For example, as described above the first device may be capable of transmitting and receiving using a first communication technology, such as BLE. At 506, the copresence server 107 may receive a first token acknowledgment from the first subset of the plurality of devices (e.g., those devices that are copresent with the first device and are capable of communication using the first communication technology).

However, as discussed above, not all devices that are near the first device may be capable of communication using the first communication technology (e.g., BLE). Therefore, at 508 the copresence server 107 may send a request to a second device of the first subset of the plurality of devices to transmit the token using the second communication technology (e.g., Bluetooth) to determine fine grain copresence of devices not capable of communication using the first communication technology. In some embodiments, to determine which device to request to transmit the token, the copresence server 107 may maintain a table of devices 115 and their communication capabilities. In some embodiments, when a device contacts the copresence server, the message includes device communication capabilities. The copresence server 107 may complete and maintain the table of device capabilities based on the information provided by each device. In other embodiments, the copresence server 107 may initially build the communication capabilities table based on communication capabilities provided by manufacturers of devices. For example, communication capabilities of a particular model of device (identified by model number, name, or the like) may be stored in the table and referenced by the model. Similarly, a version of the operating system software or proximity application software running on the device may influence what communication technologies the device are capable of using to transmit and/or receive tokens. The communications capabilities table may therefore include an indication of software versions running on a particular device and the communication capabilities of a device running that particular software version will be known to the copresence server 107. The copresence server 107 may then determine, based on information from this table and the selected first and second technologies, which devices have had an opportunity to receive the fine grain copresence token. For example, copresence server 107 may keep track of which devices have acknowledged a token and which communication technology they used to acknowledge the token. The copresence server 107 may then determine if a device, which has acknowledged the token, is capable of transmitting the token using a communication technology that no other device, of the devices which have acknowledged the token, is capable of Using this information, the copresence server 107 may direct the device to transmit the token using that particular communication technology. In one embodiment, using the communication capabilities table, the copresence server 107 may determine that a device is capable of transmitting and/or receiving using a particular communication technology, but with the current software version running on the device the communication technology is not reliable or does not work. The copresence server 107 may then determine to not use the device to transmit the token using the communication technology.

At 510, the copresence server 107 may receive a second token acknowledgment from the second subset of the plurality of devices (e.g., those devices that are copresent with the second device and are capable of communication using the second communication technology). At 512, the copresence server 107 may refine copresence based on receiving the first and second token acknowledgments.

Figure 6:
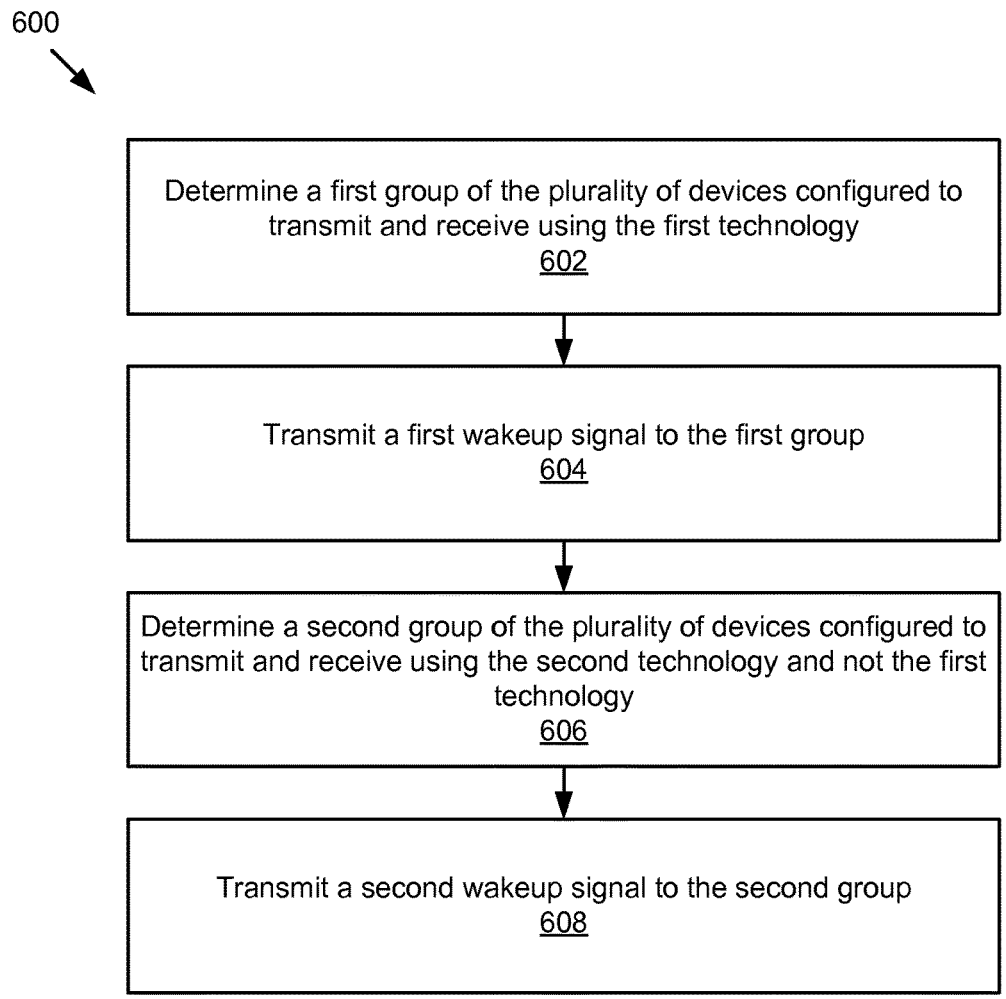
FIG. 6 is a flowchart of an example method for waking up devices based on coarse grain location information and communication capabilities.

FIG. 6 is a flowchart of an example method for waking up devices based on coarse grain location information and communication capabilities. At 602, the copresence server 107 may determine a first group of the plurality of devices configured to communicate using the first communication technology. For example, as discussed above, the copresence server 107 may maintain a table, list, or other data structure of devices and their communication capabilities. Based on which communication technology the copresence server 107 has determined to use for transmitting the fine grain copresence token, the copresence server 107 may determine, using the table, which devices are capable of communication using that particular communication technology. At 604, the copresence server 107 may then transmit the first wake up signal to the first group of devices (e.g., those devices that are in the proximity of the first transmitting device and are capable of communication using the first communication technology).

At 606, the copresence server 107 may determine a second group of the plurality of devices configured to transmit and receive using the second communication technology and not the first communication technology (e.g., those devices that are in the proximity of the first and second transmitting devices but are not capable of communication using the first communication technology). At 408, the copresence server 107 may transmit second wake up signal to the second group.

Figure 7:
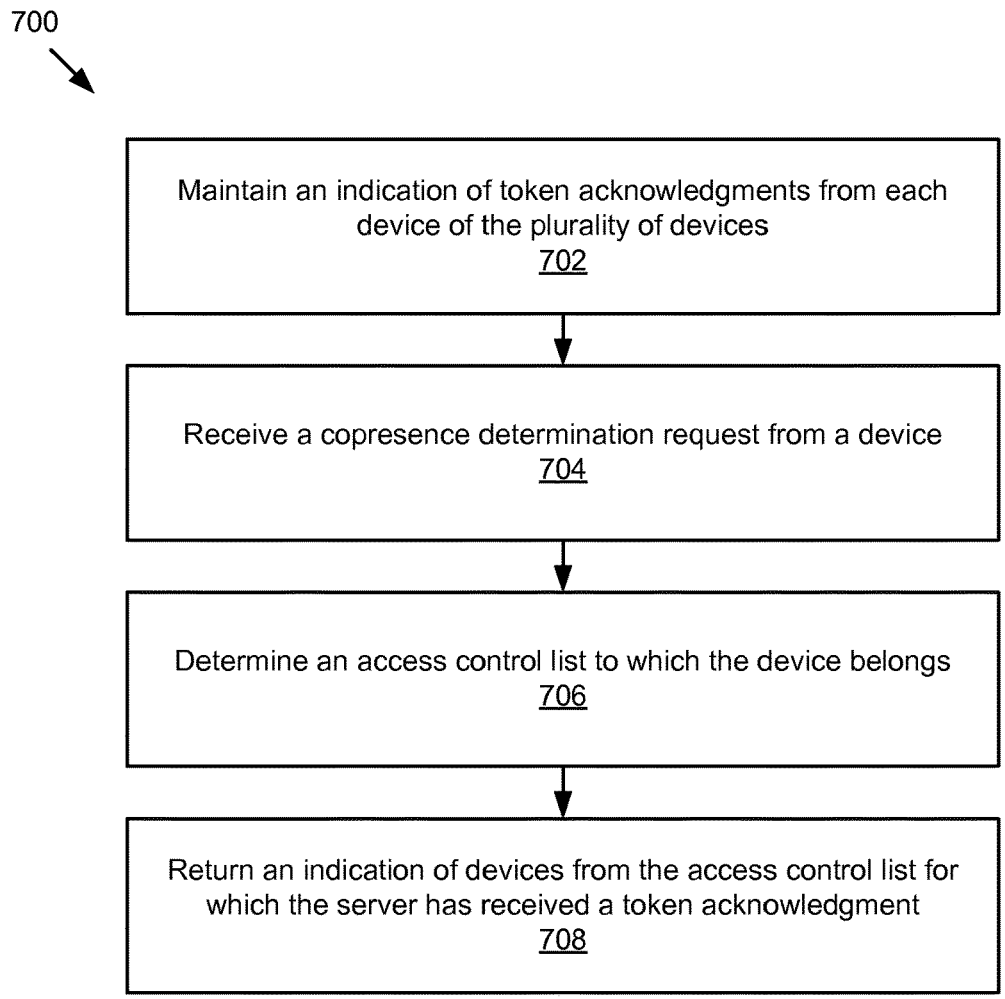
FIG. 7 is a flowchart of an example method for reusing copresence tokens for subsequent copresence determination requests.

FIG. 7 is a flowchart of an example method for reusing copresence tokens for subsequent copresence determination requests. At 702 the copresence server 107 maintains an indication of token acknowledgments from each device of the plurality of devices. For example, the copresence server 107 may maintain a table, list, or other data structure that includes devices that have received and acknowledged the fine grain copresence token. As described above, this table or data structure may be used for subsequent copresence requests such that battery power of the devices 115 may be preserved by not repeating transmission of the fine grain copresence token. At 704 the copresence server 107 may receive a copresence determination request from a device and at 706 may determine an access control list to which the device belongs. At 708 the copresence server 107 may return an indication of devices from the access control list for which the server has received the token acknowledgment. In some embodiments, if the copresence server 107 determines that there are nearby devices that have not acknowledged the fine grain copresence token, the copresence server 107 may initiate the process for transmitting a new fine grain copresence token.

FIG. 8 is a graphic representation 800 of an example user interface generated by the user interface engine 210 for providing a user with copresence of other users. In the illustrated embodiment, the user interface 800 includes a copresence button 801 clickable for a user to choose to find who is nearby. For example, if the first user clicks the proximity button 801, a list 803 of other users who are present near the first user will appear. The list 803 includes entries 811, 813, 815 that indicate three other users near the first user, how they are connected to the first user and their current physical distances to the first user. In the illustrated embodiment, the list 803 can be a ranked list generated by the ranking engine 208 based on certain criteria. For example, the list 803 of other users 811, 813, 815 can be ranked based on how closely they are connected to the first user and how far they are physically from the first user. The second user 813 is physically farther away from the first user than the third user 815, however, is ranked higher because the second user 813 has a much closer connection to the first user (e.g., family) than the third user 815 (e.g., follower) has.

FIG. 9 is a graphic representation 900 of an example user interface generated by the user interface engine 210 in which a user can permit others to detect the user's copresence according to one embodiment. The example user interface 900 includes a permission button 901 clickable for a user to make privacy settings. For example, if the user clicks the permission button 901, the user interface 900 provides detection permission options for the user to select. In the illustrated example, the user interface 900 displays a permission option box 903 including optional entries that can be selected by the user to permit everyone, only people the user follows or the user is friends with in certain social networks, only people the user has contacted at least once, or certain other users specified by the user to see that the user is present.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the present disclosure is not described with reference to any particular programming language. It will be appreciated that a variety of programming languages may be used to implement the teachings of the present disclosure as described herein.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The foregoing description has been presented for the purposes of illustration and description. It is not intended to be exhaustive or to limit the present disclosure to the precise form disclosed. Many modifications and variations are possible in light of the above teaching. It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the fixture. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
    determining, using one or more processors, that a plurality of devices have a coarse grain copresence;
    transmitting a wakeup signal to the plurality of devices responsive to the determination that the plurality of devices have the coarse grain copresence;
    sending a first request to a first device of the plurality of devices to transmit a first token using a first communication technology to determine a first fine grain copresence, wherein the first token is a unique identifier with a server-enforced lifespan;
    receiving a first token acknowledgment from a first subset of the plurality of devices;
    sending a second request to a second device of the first subset of the plurality of devices to transmit a second token using a second communication technology to determine a second fine grain copresence, wherein the first and second fine grain copresence are each associated with a communication range that is smaller than that associated with the coarse grain copresence;
    receiving a second token acknowledgment from a second subset of the plurality of devices;
    refining the coarse grain copresence into refined copresence using the first fine grain copresence based on receiving the first token acknowledgement and the second fine grain copresence based on receiving the second token acknowledgment; and
    performing an action based on the refined copresence.

2. A computer-implemented method comprising:
    transmitting a wakeup signal to a plurality of devices responsive to a determination that the plurality of devices have a coarse grain copresence based on coarse grain location information;
    sending a first request to a first device of the plurality of devices to transmit a first token using a first communication technology to determine a first fine grain copresence, wherein the first token is a unique identifier with a server-enforced lifespan;
    receiving a first token acknowledgment from a first subset of the plurality of devices;
    sending a second request to a second device of the first subset of the plurality of devices to transmit a second token using a second communication technology to determine a second fine grain copresence, wherein the first and second fine grain copresence are each associated with a communication range that is smaller than that associated with the coarse grain copresence;
    receiving a second token acknowledgment from a second subset of the plurality of devices; and
    refining the coarse grain copresence into refined copresence using the first fine grain copresence based on receiving the first token acknowledgement and the second fine grain copresence based on receiving the second token acknowledgment.

3. The computer-implemented method of claim 2, further comprising:
    maintaining a list of devices and their corresponding communication technology capabilities for determining which device to request to transmit the first or the second token.

4. The computer-implemented method of claim 2, wherein transmitting the wakeup signal comprises:
    determining a first group of the plurality of devices configured to transmit and receive using the first communication technology;
    transmitting a first wakeup signal to the first group;
    determining a second group of the plurality of devices configured to transmit and receive using the second communication technology and not the first communication technology; and
    transmitting a second wakeup signal to the second group.

5. The computer-implemented method of claim 2, wherein the coarse grain location information is one or more of GPS data and Wi-Fi data.

6. The computer-implemented method of claim 2, wherein the first or the second token is transmitted via one or more of inaudible audio, audible audio, Bluetooth, Bluetooth Low Energy (BLE), Wi-Fi, and near field communication.

7. The computer-implemented method of claim 2, further comprising:
- maintaining, via a server, an indication of token acknowledgements from each device of the plurality of devices;
- in response to the first request from the first device belonging to a first access control list, returning a first indication of devices from the first access control list for which the server has received the first token acknowledgement; and
- in response to the second request from the second device belonging to a second access control list, returning a second indication of devices from the second access control list for which the server has received the second token acknowledgement.

8. The computer-implemented method of claim 2, wherein sending the first request to the first device to transmit the first token using the first communication technology comprises instructing the first device to transmit the first token using an audio signal multiplied by a code.

9. The computer-implemented method of claim 2, further comprising performing an action based on the refined copresence.

10. The computer-implemented method of claim 9, wherein performing the action is based on privacy settings of the plurality of devices.

11. A computer program product comprising a non-transitory computer usable medium including a computer readable program, wherein the computer readable program when executed on a computer causes the computer to:
- transmit a wakeup signal to a plurality of devices responsive to a determination that the plurality of devices have a coarse grain copresence based on coarse grain location information;
- send a first request to a first device of the plurality of devices to transmit a first token using a first communication technology to determine a first fine grain copresence, wherein the first token is a unique identifier with a server-enforced lifespan;
- receive a first token acknowledgment from a first subset of the plurality of devices;
- send a second request to a second device of the first subset of the plurality of devices to transmit a second token using a second communication technology to determine a second fine grain copresence, wherein the first and second fine grain copresence are each associated with a communication range that is smaller than that associated with the coarse grain copresence;
- receive a second token acknowledgment from a second subset of the plurality of devices; and
- refining the coarse grain copresence into refined copresence using the first fine grain copresence based on receiving the first token acknowledgement and the second fine grain copresence based on receiving the second token acknowledgment.

12. The computer program product of claim 11, wherein the computer readable program is further configured to cause the computer to: maintain a list of devices and their corresponding communication technology capabilities for determining which device to request to transmit the first or the second token.

13. The computer program product of claim 11, wherein to transmit the wakeup signal, the computer readable program is further configured to cause the computer to:
- determine a first group of the plurality of devices having a capability to transmit and receive using the first communication technology;
- transmit a first wakeup signal to the first group;
- determine a second group of the plurality of devices having the capability to transmit and receive using the second communication technology and not the first communication technology; and
- transmit a second wakeup signal to the second group.

14. The computer program product of claim 11, wherein the coarse grain location information is one or more of GPS data and Wi-Fi data.

15. The computer program product of claim 11, wherein the first or the second token is transmitted via one or more of inaudible audio, audible audio, Bluetooth, Bluetooth Low Energy (BLE), Wi-Fi, and near field communication.

16. The computer program product of claim 11, wherein the computer readable program is further configured to cause the computer to:
- maintain, via a server, an indication of token acknowledgements from each device of the plurality of devices;
- in response to the first request from the first device belonging to a first access control list, return a first indication of devices from the first access control list for which the server has received the first token acknowledgement; and
- in response to the second request from the second device belonging to a second access control list, return a second indication of devices from the second access control list for which the server has received the second token acknowledgement.

17. The computer program product of claim 11, wherein to send the first request to the first device to transmit the first token using the first communication technology, the computer readable program is further configured to cause the computer to instruct the first device to transmit the first token using an audio signal multiplied by a code.

18. The computer program product of claim 11, wherein the computer readable program is further configured to cause the computer to perform an action based on the refined copresence.

19. The computer program product of claim 18, wherein performing the action is based on privacy settings of the plurality of devices.

20. The computer program product of claim 11, wherein the server-enforced lifespan of the first token is based on a time the first request was made.

* * * * *